June 30, 1964     F. S. NURY     3,139,345
HYDRATION OF DRIED FRUIT
Filed April 23, 1962

F.S. NURY
INVENTOR
BY
ATTORNEYS

United States Patent Office 3,139,345
Patented June 30, 1964

3,139,345
HYDRATION OF DRIED FRUIT
Fredoon S. Nury, Richmond, Calif., assignor to the United States of America as represented by the Secretary of Agriculture
Filed Apr. 23, 1962, Ser. No. 189,650
3 Claims. (Cl. 99—104)
(Granted under Title 35, U.S. Code (1952), sec. 266)

An irrevocable, royalty-free license in the invention herein described, throughout the world for all purposes of the United States Government, with the power to grant sublicenses for such purposes, is hereby granted to the Government of the United States of America.

This invention relates to the treatment of dried fruit. A particular object of the invention is the provision of novel methods for hydrating dried fruit. Further objects of the invention will be evident from the following description wherein parts and percentages are by weight, unless otherwise specified.

Figure 1:
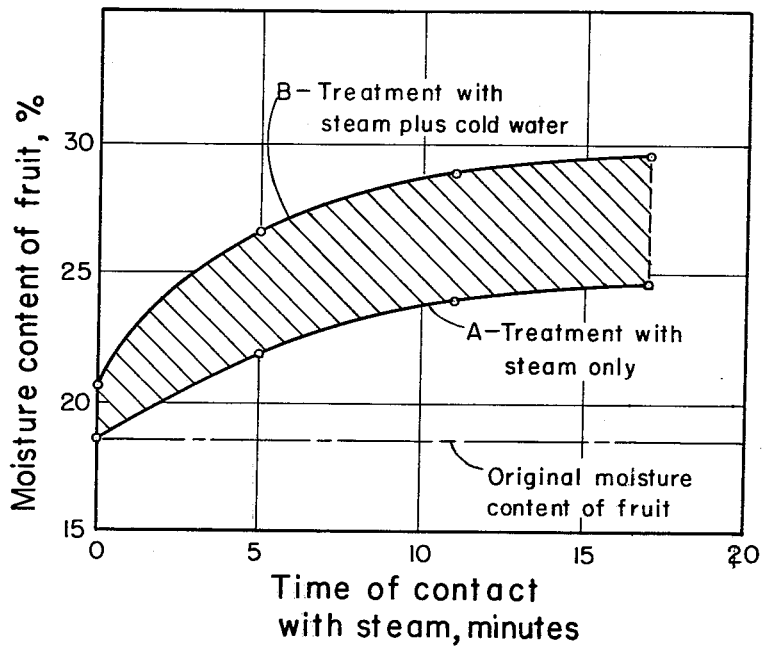
Figure 2:
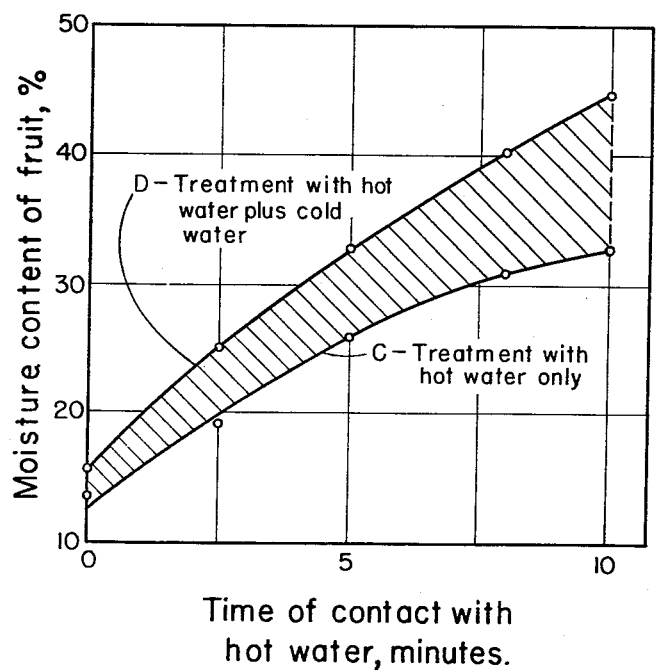

FIGURES 1 and 2 in the annexed drawing are graphs depicting the increase in moisture content of prunes and figs, respectively, treated in accordance with the invention.

In the dried fruit industry it is conventional practice to hydrate dried fruit before packaging the products for sale. This hydration is carried out to improve the character of the fruit. Thus, the dried fruit as it reaches the processor has a low moisture content whereby its texture is so tough or hard that it can be eaten only with difficulty and, if it is to be cooked, requires a presoak in water before cooking. On the other hand, the hydrated fruit is soft and tender so that it can be consumed directly. Also, if the product is to be cooked, no soaking is needed. The amount of moisture which is added to the fruit will vary depending on individual choice, trade practices, etc. In general, the moisture content of the hydrated fruit may vary anywhere from about 15 to 45%. In the case of raisins a preferred moisture range is 15 to 30%; with prunes a preferred moisture range is 25 to 45%; with figs a preferred moisture range is 20 to 40%.

Various methods have been advocated for accomplishing the desired hydration. These methods all involve contacting the dried fruit with water in the liquid or vapor form, employing various conditions of time and temperature. In accordance with a method described in Patent No. 2,789,057, the hydration is effectuated by immersing the fruit in water which is maintained at 120° C. and held under superatmospheric pressure to prevent it from boiling. Following contact with this water at a temperature above its normal boiling point, the fruit is abruptly chilled by immersion in cold water to prevent explosion of the fruit as it emerges from the pressurized system.

In accordance with the present invention, dried fruit is hydrated by a process which involves two distinct steps. In the first step the fruit is contacted with water—in the liquid or vapor state—at about its normal boiling point (212° F.) and at normal (atmospheric) pressure. This contact of the fruit with the hot water or steam is continued for a period long enough for the tissue to take up a portion of the total increase in moisture desired in the product. Depending on such factors as the initial moisture content of the fruit, the size and type of fruit, the final moisture content desired, etc., this contact time may be anywhere from 15 seconds to 20 minutes. Following contact of the fruit with hot water or steam, the fruit without any delay is contacted with cold water, that is, water at about 50–80° F., maintained at normal (atmospheric) pressure. The fruit is held in contact with the cold water for a period long enough for it to absorb additional water so that its total moisture content is now at the level desired for the final product. Depending on such factors as the moisture content of the fruit prior to immersion in the cold water, the size and type of fruit, the final moisture content desired, etc., this contact time may be anywhere from 15 seconds to 3 minutes. Following this step, the fruit is drained and surface water removed by shaking, blotting, or by directing jets of air at the fruit. The hydrated fruit is then ready for packaging and sale.

As explained above, the process of the invention involves two distinct steps—first a contact with boiling water or steam, then contact with cold water. In both of these steps the moisture content of the fruit increases. Moreover, the total amount of moisture taken up by the fruit during these steps is greater than the amount of water which would be taken up were the fruit to be contacted with hot water or steam for the same period of time. This fact is illustrated by the following example: A lot of dried figs containing 14% moisture was divided into two lots. One lot (A) was contacted with boiling water for a period of 8 minutes. The product was removed from the hot water and drained. The moisture content of the fruit was 30.5%. The other lot of figs (B) was contacted with boiling water for 5 minutes, then immediately plunged into cold water and held therein for 3 minutes. The fruit was removed from the cold water and drained. Its moisture content was found to be 32.5%. It is thus evident that the combination of hot and cold water treatment (total time 8 minutes) caused the fruit to take up more water than did hot water treatment alone for 8 minutes. In a further extension of this experiment, it was found that a contact time with hot water alone of 10 minutes was required to bring the figs to a moisture level of 32.5%.

The practical advantages which accrue from the application of the invention are manifold. A primary point is that less heat is applied to the fruit than would otherwise be the case. This follows because only part of the hydration is accomplished with hot water or steam, the remainder takes place in cold water. As a consequence, damage to flavor and color of the fruit is substantially lessened. Another point is that there is better retention of soluble solids by the fruit. Thus the leaching of solubles such as sugar occurs at a faster rate at higher temperatures and since only a portion of the rehydration is done at high temperatures, the total amount of solubles leached from the fruit is less than in a situation where the rehydration would be done entirely with hot water. Other advantages of the process of the invention are an increase in output of product per unit time and a reduction in fuel consumption. A further item to be emphasized is that in the process of the invention, the treatments are carried out at normal (atmospheric) pressure. This means significant savings in equipment costs since ordinary devices open to the atmosphere are used and there is no need to provide pressure resistant— hence necessarily expensive—equipment. Moreover, by conducting the treatments at atmospheric pressure the entire system of flow of materials and control of fluids is made simpler and less costly from both construction and operating standpoints.

A particular advantage of the invention is that it does not require any specialized equipment but can be carried out with apparatus that is generally available in fruit processing plants, for example, tanks or blanchers. In conducting the process on a batch scale, the fruit may be held in perforated baskets which are first dipped in boiling water, then removed and immersed in cold water. In continuous operation a conventional blancher is of advantage as the fruit can be spread on the screen belt of the blancher and exposed first to jets of boiling water, steam, or both boiling water and steam, then exposed to jets of cold water to accomplish the second step of the process. The particular apparatus used forms no part of the present invention and those skilled in the art will have no difficulty in adapting other forms of apparatus for use in the process of the invention.

The process of the invention may be employed for the hydration of any type of dried fruit, for example, raisins, figs, prunes, apricots, pears, peaches, apples, currants, etc.

As noted above, in the first step of the process of the invention, the dried food is contacted with boiling water, steam, or a mixture of steam and boiling water. With most fruits, it is preferred to employ boiling water to achieve hydration at optimum rate. However, with raisins it is generally preferred to use steam.

A critical point in the process of the invention is that the fruit be transferred without delay from the first step to the second step. Thus, it is essential that the fruit be hot when it contacts the cold water. This causes a rapid uptake of water, probably effectuated by condensation of steam in the fruit tissue causing zones of low pressure which are then relieved by water being drawn into the fruit through natural fissures in the skin.

It is obvious that various modifications may be employed in applying the process of the invention. Such a modification would be, for example, a multiple application of the process. Thus if it is desired to prepare hydrated fruit of especially high moisture content, this can be done effectively by applying the first and second steps and then repeating such treatment one or more times again.

The invention is further demonstrated by the following illustrative examples:

*Example 1*

The starting material in this case was dried prunes having a moisture content of 18.5%. The prunes were placed in a conventional steam blancher open to the atmosphere where the prunes were contacted with jets of steam. From time to time samples of the prunes were removed from the blancher and immediately plunged into a tank filled with water at room temperature and held therein for about 3 minutes. The prunes were then removed from the tank, drained, and shaken to remove surface water and their moisture content determined. In each case, a sample of the prunes removed from the blancher was taken for moisture analysis, thus to provide information on the degree of water taken up during the steaming step alone.

The results are tabulated below:

| Time of contact with steam, min. | Moisture content before cold water treatment, percent | Moisture content after cold water treatment, percent |
|---|---|---|
| 0 | 18.5 | 20.6 |
| 5 | 21.7 | 27.4 |
| 11 | 23.8 | 28.7 |
| 17 | 24.6 | 29.4 |

The above data are shown graphically in FIG. 1 of the annexed drawing. Referring to the figure, curve A represents the moisture added to the prunes by contact with steam alone whereas curve B represents the moisture added to the prunes by contact with both steam and cold water. The shaded area between curves A and B designates the increment of moisture taken up by the prunes during the cold water treatment alone.

It is obvious from the curves that the combination treatment (steam and cold water) produces far better results than can be obtained with steam alone. For example, treatment with steam alone for 17 minutes barely reaches the 25% moisture level whereas 5 minutes of steaming plus 3 minutes in cold water yields a product containing over 26% moisture.

It is also evident from the slope of curve A that steaming by itself cannot be expected to increase the moisture content of the fruit to a level higher than 25% even if the time is greatly extended whereas with the combination treatment a moisture content of about 30% can be achieved.

*Example 2*

The starting material in this case was dried figs having a moisture content of 14%. The figs were immersed in a tank of water at about 212° F. At intervals, samples of the figs were removed from the hot water and immediately plunged into a tank of water at room temperature and held therein for 3 minutes. The figs were then removed from the tank, drained, shaken to remove surface water, and their moisture content determined. In each case, a sample of the figs removed from the hot water tank was taken for moisture analysis, thus to provide information on the amount of water taken up by the hot water treatment alone.

The results are tabulated below:

| Time of contact with hot water, min. | Moisture content before cold water treatment, percent | Moisture content after cold water treatment, percent |
|---|---|---|
| 0 | 14.0 | 16.0 |
| 2.5 | 19.0 | 25.0 |
| 5 | 26.0 | 32.5 |
| 8 | 30.5 | 40.0 |
| 10 | 32.5 | 44.5 |

The above data are shown in FIG. 2 of the annexed drawing. Referring to this figure, curve C represents the moisture added to the figs by contact with hot water alone; curve D represents the moisture added to the figs by contact with both hot and cold water. The shaded area between curves C and D represents the increment of moisture added to the figs during the cold water treatment.

The effectiveness of the process is evident, for example, from the fact that a combination of 5 minutes in the hot water plus 3 minutes in cold water gave the same moisture content (32.5%) as did 10 minutes treatment with hot water alone.

*Example 3*

The starting material in this run was dried prunes having a moisture content of 17%. The prunes were treated first by contact with boiling water, then with cold water as described in Example 2.

The results are tabulated below:

| Time of contact with hot water, min. | Moisture content before cold water treatment, percent | Moisture content after cold water treatment, percent |
|---|---|---|
| 5 | 24.4 | 27.0 |
| 11 | 29.5 | 33.0 |
| 17 | 33.0 | 36.0 |

*Example 4*

The starting material in this case was raisins having a moisture content of 9%. The raisins were treated first with boiling water, then with cold water as described in Example 2. However, in this case the raisins were held in the cold water for only 15 seconds.

The results are tabulated below:

| Time of contact with hot water, seconds | Moisture content before cold water treatment, percent | Moisture content after cold water treatment, percent |
|---|---|---|
| 15 | 15 | 21 |
| 30 | 16 | 22 |
| 42 | 18 | 24 |

Example 5

The starting material in this case was dried figs having a moisture content of 14%. The figs were treated first with steam, then with cold water as described in Example 1.

The results are tabulated below:

| Time of contact with steam, min. | Moisture content before cold water treatment, percent | Moisture content after cold water treatment, percent |
|---|---|---|
| 2 | 17.0 | 24.0 |
| 5 | 19.5 | 27.0 |
| 10 | 20.5 | 32.5 |

Having thus described the invention, what is claimed is:

1. A method of treating dried fruit to increase the moisture content thereof to a predetermined level of about from 15 to 45% which comprises the steps of (a) contacting the dried fruit with a member of the group consisting of water and steam, at a temperature of about 212° F. and at atmospheric pressure for a period of time within the range of about from 15 seconds to 20 minutes, sufficient to enable the fruit to absorb moisture but insufficient to enable the fruit to attain the said predetermined level of moisture content and (b) contacting the so-treated fruit without any substantial delay with cold water for a period of time within the range of about from 15 seconds to 3 minutes sufficient to enable the fruit to absorb additional water to reach the said predetermined level of moisture.

2. A method for treating dried fruit to increase the moisture content thereof to a predetermined level of about from 15 to 45% which comprises the steps of (a) contacting the dried fruit with water at a temperature of about 212° F. and at atmospheric pressure for a period of time within the range of about from 15 seconds to 20 minutes sufficient to enable the fruit to absorb moisture but insufficient to enable the fruit to attain the said predetermined level of moisture content and (b) contacting the so-treated fruit without substantial delay with cold water for a period of time within the range of about from 15 seconds to 3 minutes sufficient to enable the fruit to absorb additional water to reach the said predetermined level of moisture.

3. A method for treating dried fruit to increase the moisture content thereof to a predetermined level of about from 15 to 45% which comprises the steps of (a) contacting the dried fruit with steam at a temperature of about 212° F. and at atmospheric pressure for a period of time within the range of about from 15 seconds to 20 minutes sufficient to enable the fruit to absorb moisture but insufficient to enable the fruit to attain said predetermined level of moisture content and (b) contacting the so-treated fruit without substantial delay with cold water for a period of time within the range of about from 15 seconds to 3 minutes sufficient to enable the fruit to absorb additional water to reach said predetermined level of moisture.

References Cited in the file of this patent

UNITED STATES PATENTS 2,789,057  Schwartz _____ Apr. 16, 1957

OTHER REFERENCES

The Boston Cooking School Cook Book, 7th Ed., Garden City, New York, 1945, page 63.